United States Patent [19]

Riead

[11] 4,426,805

[45] Jan. 24, 1984

[54] LINE CLAMP FOR FISHING FLOAT

[75] Inventor: John T. Riead, Cameron, Mo.

[73] Assignee: Rieadco Corporation, Cameron, Mo.

[21] Appl. No.: 414,883

[22] Filed: Sep. 3, 1982

[51] Int. Cl.³ .............................................. A01K 93/00
[52] U.S. Cl. .................................................... 43/44.95
[58] Field of Search ............................. 43/44.95, 44.94

[56] References Cited

U.S. PATENT DOCUMENTS

| | | | |
|---|---|---|---|
| 1,371,170 | 3/1921 | Johnson | 43/44.95 |
| 2,670,560 | 3/1954 | Matras | 43/44.95 |
| 2,842,888 | 7/1958 | Landrum | 43/44.95 |
| 3,060,621 | 10/1962 | Schmidt | 43/44.95 |
| 3,664,053 | 5/1972 | Beverly | 43/44.95 |
| 3,913,256 | 10/1975 | Morris | 43/44.95 |
| 3,925,920 | 12/1975 | Walker | 43/44.95 |

Primary Examiner—Gene P. Crosby

Attorney, Agent, or Firm—John A. Hamilton

[57] ABSTRACT

A line clamp for a fishing float having a buoyant body member, the clamp consisting of a stem fixed in the body member and projecting outwardly therefrom, having at its outer end a conically enlarged head terminating in a flat circular flange having a re-entrant peripheral lip, the lip flange and head being notched radially inwardly. A plunger slidably encircles the stem and has at its outer end an enlarged head socketed to mate with said stem head, flange and lip, except for the slot thereof, and a spring biasing said plunger outwardly on the stem. The plunger is retractable manually against the spring to expose the head of the stem to permit looping of a fishing line thereabout with its reaches projecting through the notch, so that the line is clamped between the stem head and plunger when the plunger is released.

3 Claims, 5 Drawing Figures

U.S. Patent
Jan. 24, 1984
4,426,805
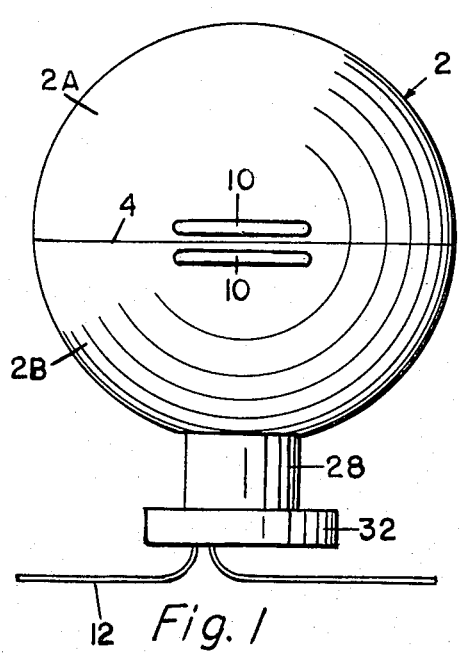
Fig. 1
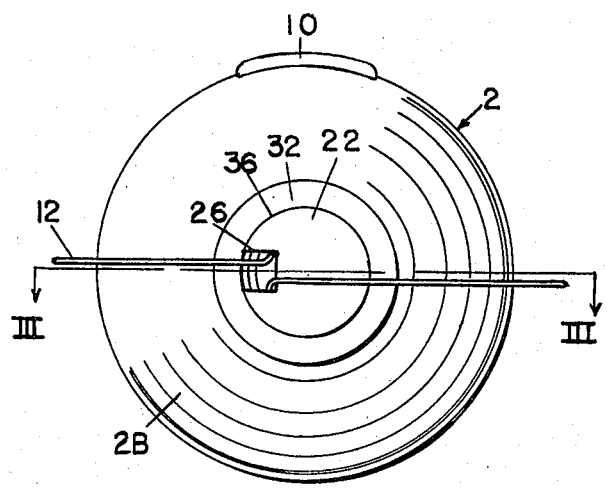
Fig. 2
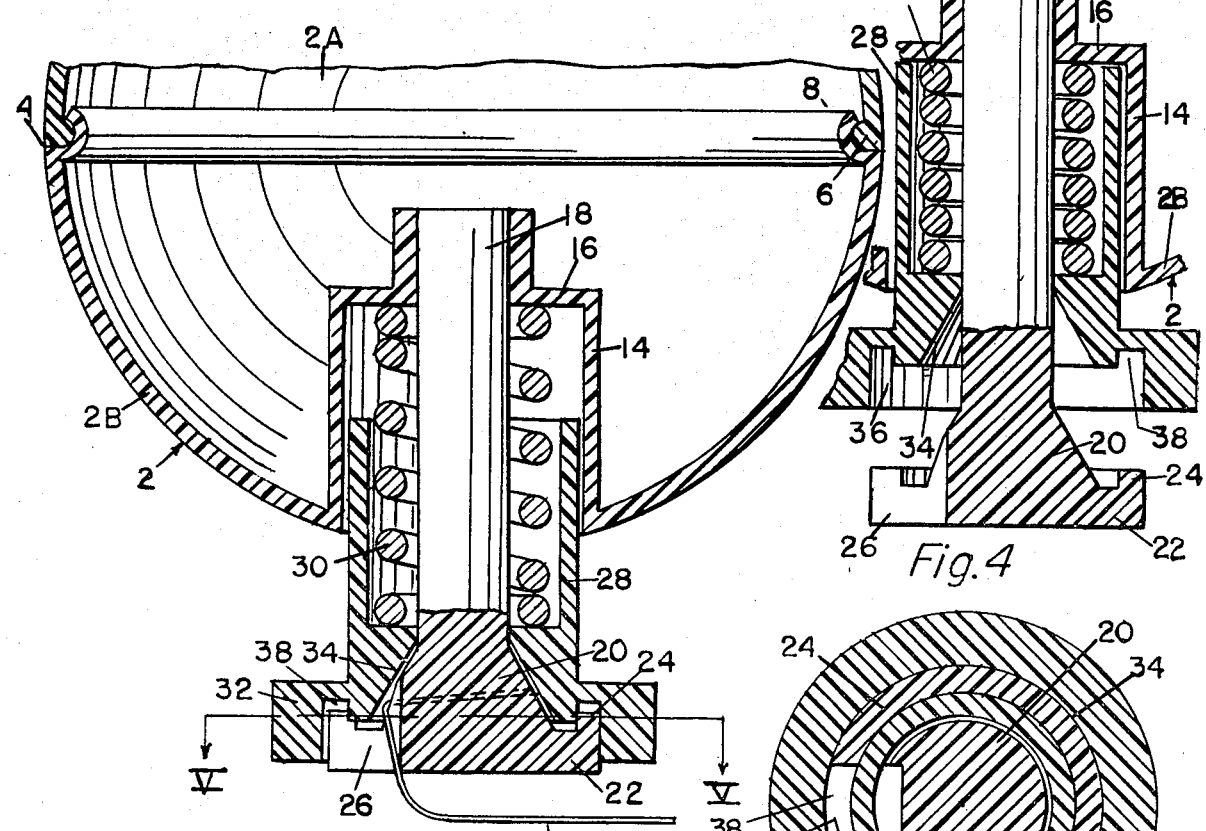
Fig. 3
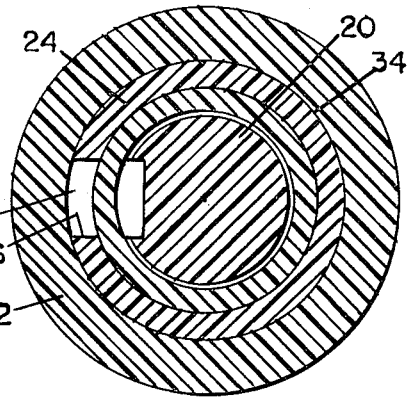
Fig. 4
Fig. 5

LINE CLAMP FOR FISHING FLOAT

This invention relates to new and useful improvements in fishing floats, or "bobbers", and has particular reference to a float including a new and novel clamp for securing a fishing line releasably thereto.

A fishing float normally consists of a buoyant body member attachable to a fishing line at any desired distance from the hook and lure attached to the end of the line, and operable as it floats at the water surface to support the hook and lure at any distance below the surface at which it may be desired to fish. The float may be attached to any point of the line for this purpose, by means of a clamp device incorporated in the float body itself.

The line clamps in the most common use at the present time usually incorporate a wire projecting from the lure body and having its outer end bent to form a re-entrant hook, and a plunger encircling the wire and spring biased outwardly to enclose both reaches of the wire hook. When the plunger is retracted inwardly by manual force, the end of the shorter reach of the hook is exposed so that a fishing line may be introduced laterally into the hook, so that when the plunger is released, the line is clamped between the plunger and the closed end of the hook. Certain shortcomings and disadvantages have become apparent in clamps of this type. Most importantly, they have a pronounced tendency to slide or slip along the fishing line, so that their pre-arranged spacing from the hook and lure at the end of the line does not remain constant. This tendency arises from the facts that such "wire-hook" clamps engage the line at only one point, and that the monofilament nylon strands commonly used for fishing lines are very hard and smooth, so that it is difficult to clamp them with enough force and tightness to preclude slipping. The difficulty is further aggravated by the fact that nylon has a "self-lubricating" characteristic, which further increases the tendency to slip. The "wire-hook" clamps also are often relatively expensive to manufacture, and require a not insignificant degree of manual dexterity to operate.

The overall object of the present invention is the provision of a line clamp which answers all of the above enumerated shortcomings of prior clamps, in that it clamps on the line with total security, and is inexpensive and easy to operate. The clamping security is provided, generally, by the provision of a pair of mating conical surfaces, urged together by spring force but separable by manual force, so that when separated, a fishing line may be looped about the male cone, and then clamped thereagainst by the female cone, under spring pressure. The cones are much larger in diameter than the fishing line, so that the line is clamped along a substantial portion of its length, to provide greater security against slippage along the line, and the angularity of the conical surfaces multiplies the spring force to apply a greater clamping force. Also, the conical surfaces may be slightly roughened, or "frosted", to provide still greater security against slippage.

However, both reaches of the line loop clamped between the clamp cones must of course emerge therefrom, to extend respectively to the fishing rod and to the hook and lure, and there therefore remains the possibility that line tension, which occurs during casting and after a fish takes the hook, could gradually "inch" the line out of engagement between the cones, unwinding the line loop engaged between the cones and eventually causing disengagement of the float from the line. Another object of this invention, accordingly, is the provision of a special configuration of the members forming the cones which positively prevents any such disengagement. Generally, these configurations consist of an annular flange at the larger end of the male cone, said flange having a re-entrant lip at its peripheral edge, the lip, flange and male cone having a radial notch formed therein through which the exiting reaches of the line are passed, and an extension on the female cone forming a socket which matches precisely with the male cone and its flange and lip, except for said notch.

Other objects are simplicity and economy of manufacture, and efficiency and dependability of operation.

With these objects in view, as well as other objects which will appear in the course of the specification, reference will be had to the accompanying drawing, wherein:

FIG. 1 is a side elevational view of a fishing float having incorporated therein a line clamp embodying the present invention, shown operatively engaged on a fishing line, FIG. 2 is an inverted plan view of the parts as shown in FIG. 1, FIG. 3 is an enlarged, fragmentary sectional view taken on line III—III of FIG. 2, with parts left in elevation and partially broken away, FIG. 4 is a fragmentary view similar to FIG. 3, but showing the clamp opened to receive a fishing line therein, and FIG. 5 is a sectional view taken on line V—V of FIG. 3.

Like reference numerals apply to similar parts throughout the several views, and the numeral 2 applies generally to the body of a fishing float, shown by way of example as spherical. It is formed of a plastic material, is hollow to render it buoyant, and is divided along line 4 into two halves 2A and 2B, which may be releasably joined together, with a watertight seal, by snapping an internal rib 6 extending around the periphery of the open end of one of the halves into a corresponding groove 8 of the other half, as permitted by the resilience of the plastic. The halves may be separated by inserting a coin between a pair of elongated external ribs 10 formed on the respective halves parallel to and adjacent line 4, and twisting said coin. The separation permits variable quantities of water to be put into the lure body. The addition of water adds weight to the lure in order that it may be cast longer distances, and also permits the reduction of the buoyancy of the float to exceed only slightly the weight of the hook and lure it must support, in order that a fish taking the lure will not "sense" the resistance of the float and turn aside.

In relation to the subject clamp for attaching the float to a fishing line 12, one of the halves of the float body has an integral cylindrical well 14 formed internally thereof, said well opening outwardly of the body and being closed at its inner end by a wall 16. A cylindrical stem 18 is tightly affixed at its inner end, as by sweating, in a bore formed therefor in end wall 16 and extends coaxially through well 14 to a point outside of the float body. It is of substantially smaller diameter than well 14, and its outwardly extended end portion is taperingly enlarged to form a solid male cone 20 coaxial with the stem. At the outer, larger end of cone 20, it is provided with a flat, peripheral flange 22 coaxial with stem 18 but of larger diameter than the larger end of cone 20. At its peripheral edge, and spaced apart from cone 20, flange 22 is provided with a re-entrant lip 24 around its entire periphery. A notch 26 is cut radially from the outer edge of flange 22, cutting through said flange and lip 24, and being of such depth as to extend also into cone 20, as best shown in FIGS. 2 and 3. Stem 18, cone 20, flange 22 and lip 24 may be conveniently formed as an integral, one-piece unit.

Carried for axial sliding movement in well 14 is a plunger 28 of cylindrical form, and which is bored to fit slidably around stem 18. Said plunger is socketed at its inner end to receive a coiled compression spring 30 bearing at one end against the plunger and at its opposite end against end wall 16 of well 14, whereby the plunger is biased strongly outwardly. The plunger extends outwardly from the float body, being provided at its outer end with an enlarged head 32. At its outer end, it is socketed to mate precisely with cone 20, flange 22 and lip 24, except that it does not enter notch 26. Referring to FIG. 4, this socketing includes an innermost conical socket 34 forming a female cone adapted to engage snugly over male cone 20, an outer cylindrical socket 36 sized to receive flange 22 snugly, and a peripheral groove 38 formed at the base of socket 36 for receiving lip 24. The plunger is of one-piece form. Thus the entire clamp structure, apart from float body 2 itself, consists of only three pieces—stem 18, plunger 28, and spring 30.

In operation, to engage fishing line 12 in the clamp, plunger 28 is first pressed inwardly against the pressure of spring 30 by manual force. This exposes stem cone 20 and a portion of the stem itself, as shown in FIG. 4. A loop of line 12 is then passed about cone 20, or the cylindrical portion of the stem, and both reaches of the loop are led outwardly through notch 26. The plunger is then released, so that it is moved outwardly by the spring so that the line loop is clamped between stem cone 20 and the female conical surface 34 of the plunger, as shown in FIG. 3, and the operation is complete. The line may of course be freed at any time by reversing the process.

It will be seen that the line is clamped along a much greater portion of its length than in the usual prior line clamp, in which the line is clamped at substantially only a single point by a hook of rather fine wire. This greatly increases the security by which the line is secured against longitudinal slippage between the clamping surfaces. The clamping force is increased by the conical form of the clamping surfaces, which creates a wedging action multiplying the force actually exerted by the spring. The clamping action is still further improved by slightly roughening, or "frosting" of the conical clamping surfaces. This roughening may be performed in the plastic molds by which the parts are formed, so as not to constitute an additional manufacturing step. The clamping action as thus far described may easily be sufficiently secure that the line cannot slip longitudinally by any degree of tension, up to a tension sufficient to break the line, no matter how hard and slick the surface of the line may be.

However, while the line cannot slip longitudinally, there remains the possibility that it can slip transversely of itself, particularly at its points of exit from between the clamping surfaces, since those points are secured against lateral slippage only by substantially point contact with the clamping surfaces. Moreover, this lateral slippage can be cumulative, increasing gradually as line tension continues, or is applied intermittently. Therefore, if the clamping surfaces were merely conical, and extended all the way to the outer end of the stem, the line could gradually "unwind" from the inner cone 20, and cause accidental disengagement of the float from the line. This disengagement is of course objectionable, since it results in loss of the float and its functions. Several features of the present float prevent such accidental disengagement.

First, the provision of notch 26 provides that when the line is lead outwardly therethrough, the tension is exerted to the line, a first reach thereof will exit through the outer end of said notch at the base thereof, usually at one corner. This point of the line hence cannot enter between the clamping surfaces, and is secure against lateral slippage. The second reach of the line, however, then passes over the outer lip of socket 36 of the plunger head, which of course is at its line of juncture with the stem head. If the stem head were conical to its extreme outer end, this reach of the line could then slip laterally into the space between the two conical surfaces, particularly since these surfaces are already held slightly apart by the main portion of the line loop. This slippage could again be cumulative, unwinding the line loop from the inner cone 20 and causing eventual disengagement of the float. In this case, the unwinding of the line loop would proceed from one end of the loop to the other, rather than from both ends toward the middle, as would be the case if notch 26 were not used.

The addition of flange 22 to the outer end of cone 30 assists in preventing the "second" line reach from entering between the clamping surfaces by lateral slippage thereof. To do so, the second line reach would have to slide radially outwardly along the lower surface of said flange at its juncture with slot 26. This juncture is disposed in a line angled acutely inwardly from the direction the line must extend to pass over the outer end of plunger head 32, so that to slide therealong, the line would necessarily be deviated from its direction of tension. Since the line of course resists such deviation by its own tension, any eventual lateral slippage of the second line reach into the narrow space between the stem and plunger is strongly resisted. Nevertheless, if the flange 22 were flat and planar at its inner face, the line deviation provided thereby would still be merely at an acute angle to the normal extent of the line, but still in the same general direction. Therefore, in extreme cases of high line tension, the line could still slide along the juncture of the inner surface of the flange with notch 26, and accidental disengagement could still occur. The addition of re-entrant lip 24 to flange 22 provides a final insurance against any such occurrence, since the line, in sliding along the juncture line described above, would necessarily be required to pass over said lip if it were to escape notch 26. This would require not merely an acute angular deviation of the line from its general extent, but an actual reversal of movement, which of course cannot occur so long as the line has any tension at all.

While I have shown and described a specific embodiment of my invention, it will be readily apparent that many minor changes of structure and operation could be made without departing from the spirit of the invention.

What I claim as new and desire to protect by Letters Patent is:

1. A line clamp for a fishing float having a buoyant body member, said clamp comprising:
   a. an elongated stem fixed at one end in said body member and projecting outwardly therefrom, the outer end portion of said stem being taperingly enlarged to present a conical first clamping surface confronting said body member, b. a plunger mounted for sliding movement on said stem intermediate said body member and said first clamping surface, the outer end of said plunger being formed to present a hollow, conical second clamping surface capable of mating with said first clamping surface when said plunger is moved outwardly along said stem, and c. a spring biasing said plunger outwardly along said stem, said plunger being manually retractable against said spring to separate said first and second clamping surfaces to permit looping of a fishing line around said stem intermediate said surfaces, whereby said line loop is clamped between said surfaces when said plunger is released, the outer end of said stem at the outer end of the conical clamping surface thereof, having a notch formed radially inwardly from its periphery to such a depth that its base, which is generally parallel to the axis of the stem, intersects the conical clamping surface of said stem, said notch functioning to accomodate the reaches of said fishing line extending from said line loop between said clamping surfaces.

2. A line clamp as recited in claim 1 wherein the outer end of said stem, at the outer end of the conical clamping surface thereof, is provided with a generally planar peripheral flange normal to the stem axis, said notch also extending through said flange, and wherein said plunger is provided, at the outer end of the conical clamping surface thereof, with a socket capable of receiving said flange therein.

3. A line clamp as recited in claim 2 wherein said flange is provided with a re-entrant peripheral lip, extending toward said plunger and of greater diameter than the conical clamping surface thereof, said notch also extending through said lip, and wherein said plunger socket is provided at its base with a peripheral groove capable of receiving said lip therein.

* * * * *